United States Patent [19]
Lovato

[11] Patent Number: 5,624,223
[45] Date of Patent: Apr. 29, 1997

[54] TRUCK BED UNLOADING APPARATUS

[76] Inventor: Timothy J. Lovato, 4696 Josephine St., Denver, Colo. 80216

[21] Appl. No.: 620,253

[22] Filed: Mar. 22, 1996

[51] Int. Cl.⁶ .......................................................... B60P 1/00
[52] U.S. Cl. ............................................ 414/480; 414/522
[58] Field of Search ............................. 414/509, 522, 414/546, 523, 480, 469, 477, 539

[56] References Cited

U.S. PATENT DOCUMENTS

| | | | |
|---|---|---|---|
| 2,298,747 | 10/1942 | Agar | 414/509 |
| 3,687,314 | 8/1972 | Haugland | 414/522 |
| 3,826,387 | 7/1974 | Galis | 414/522 |
| 5,232,329 | 8/1993 | Livingston | 414/547 |

*Primary Examiner*—Thomas J. Brahan
*Attorney, Agent, or Firm*—Ramon L. Pizarro; Edwin H. Crabtree

[57] ABSTRACT

A device for carrying and unloading a load of material from a bed on a truck. The device includes a main panel with an upper surface, a forward edge and a lower surface with skid pads or casters for sliding over the surface of the bed of the truck. The device also includes a front panel with an upper surface, a rearward edge, and a lower surface which also includes skid pads or casters for sliding over the surface of the bed of the truck. A front hinge connects the forward edge of the main panel to the rearward edge of the front panel and allows front panel to swing in a direction facing the lower surface of the front panel, so that the load of material together with device can be slid over and out of the bed of a truck when unloading, and so that the front panel swings under the main panel as the load, together with the device, slides out of the bed of the truck, which in turn causes the separation of the load of material from the device when the load is unloaded from the bed of the truck.

20 Claims, 5 Drawing Sheets

TRUCK BED UNLOADING APPARATUS

BACKGROUND OF THE INVENTION (a) Field of the Invention

This invention generally relates to field of devices for unloading trucks, and more particularly, but not by way of limitation, to a portable sliding device for unloading the bed of pickup trucks and the like.

(b) Discussion of the Prior Art

The need to devise a System or apparatus for unloading the bed of a truck has long been recognized. However, attempts at solving the problems associated with unloading the bed of a truck have typically followed similar approaches. Perhaps the most common type of unloading mechanism is the well known hydraulic lifting device that simply tilts the bed of larger trucks. Moreover, the devices employed for unloading smaller trucks or utility vehicles have resulted in complicated solutions that require significant modifications to the vehicle. For example, in U.S. Pat. No. 2,797,828 to Fritsche an apparatus requiring guide rails or stationary supports is taught. The Fritsche device allows the convenient loading and unloading of the back of a vehicle with light loads such as boxes that may be lifted by an individual. The device adds convenience in that it makes it easy to load something on a tailgate, for instance, and then use the device to stow the load into the vehicle's cargo carrying area. The design, although convenient, requires attachment of guides or rails to the vehicle. Moreover, the device is intended to stay inside the vehicle, thereby permanently modifying the vehicle's interior.

In yet another example, U.S. Pat. No. 3,084,816 to Bozio, another rail or guide mounted device is taught. The Bozio device offers very similar advantages as does the Fritsche invention. The Bozio device requires much more modification of the vehicle than does the Fritsche device, but provides a much larger loading zone and allows for the access of hidden panels such as the panels that may be used to conceal a spare tire, for example. The Bozio device suffers from the same limitations as the Fritche design, but suffers from additional limitations in that it longer tracks which may become filled with debris a and jammed.

In yet another example, U.S. Pat. No. 5,454,684 to Berens. The Berens patent teaches the use of a removeable cargo box between a pair of rails or support guides. To unload the vehicle, the removeable cargo box slides out and swings over the ends of the rails to dump the materials out of the cargo box. This approach requires a sub-frame, rails, and a large cargo box. In addition to the mechanical complications of this system, it is apparent that the large box and sub assembly will be cumbersome and difficult to store whenever the device is not in use. Moreover, the installation of the device may always require several individuals in order to install the device in a vehicle. Still further, the device itself takes up a significant amount of room which impairs the amount of cargo that can be carried with the vehicle when the device is in use.

In yet another approach, U.S. Pat. No. 5,184,931 to Safko, the use of a cargo box with a pair of belts are used for pulling the cargo box out of the bed of a truck. The Safko device is a simple, effective approach, but the device suffers from the limitation that it is large and essentially unsupported, and that because of its size it will likely remain in the bed of the truck when not in use. This kind of an arrangement is very dangerous since the large box may be tossed from the bed of the truck in the event of an accident. Moreover, if the box is allowed to remain installed on the truck, the space between the bed and the cargo box is likely to collect water and debris, which can speed up the corrosion of the bed of the truck. Still further, the device does not give the driver of the truck any indication of when the dumping operation is finished. Thus the driver may continue to continue back up over the belting until the belting is torn off of the cargo box or the cargo box is destroyed.

Other examples of devices that carry and unload cargo on the bed of a truck include U.S. Pat. No. 3,381,835 to Lee, which also provides rails and a substructure to hold a cargo box. U.S. Pat. No. 3,687,314 to Haugland, which teaches the use of a sliding platform made from hinged sections that allow for the creation of a loading and unloading ramp for use with snowmobiles and the like. In yet another example U.S. Pat. No. 3,768,673 to Nydam et al. teaches the use of a system with rails which includes an extendable platform that can carry a cargo box. The extendable platform serves as a ramp, bridge, and the like. Still another example is U.S. Pat. No. 2,852,303 which is a rail mounted extension to the cargo box. The examples that use rails suffer from the limitations of complexity, weight, and impractical stowability.

Other devices, such as the Haugland device and the device taught in U.S. Pat. No. 5,090,335 to Russell, teach the use of rollers to impart motion on to a platform or ramp. The Russell device is limited in that it is really not well suited for carrying loads of material or for quick unloading of any materials that may be carried on top of the device. Similarly, the Hughland device provides good carrying capabilities for snowmobiles and the like, but is really not designed to solve the problems encountered when the vehicle is used for hauling lawn clippings, or other refuse.

Thus there remains a need for a simple device for supporting and unloading materials from the bed of a truck in a quick manner. Moreover there remains a need for a simple truck unloading apparatus that is inexpensive, requires little or no modifications to the vehicle, and that can be conveniently carried and stored when not in use.

SUMMARY

In light of the foregoing, a device for unloading a load of material from a truck's bed has been provided. The truck unloading apparatus comprising:

(a) a main panel having a lower surface with means for sliding over the surface of the bed of the truck;

(b) a front panel having a lower surface with means for sliding over the surface of the bed of the truck;

(c) a hinge for pivotally connecting the main panel to front panel, so that the load of material together with device can be slid over and out of the bed of a truck when unloading.

The front panel is configured so that it is shorter than the distance between the bed of the truck and the ground immediately below the truck. This configuration allows the front panel to swing under the main panel as the load, together with the device, slides out of the bed of the truck. This "curling under" effect causes the load of material to separate from the device as the load is forced out from the bed of the truck.

It is preferred that the hinge connecting the main panel and the front panel be a two way hinge. The use of this kind of hinge allows the device to be easily folded up and removed from the vehicle when not in use.

A rear panel with a lower surface with means for sliding over the surface of the bed of the truck may be added to the device. This rear panel is preferably attached by means of a one way hinge to an edge that is opposite to the edge on which the front panel is attached. By including this rear panel one may cover a greater area of the bed of the truck. Also, by including the rear panel one may slide the device out of the bed of the truck and allow the main panel to slide past the edge of the bed of the truck. Once the main panel slides over the edge of the bed of the truck, the panel will begin to fall over the edge of the bed, forcing the rear panel to swing up, giving the materials to be unloaded a final push away from the truck and the invention.

The means for sliding over the bed which are mounted on the lower surfaces of the panels may be skid pads made from a polymer material such as polytetrafluoroethylene or nylon. However, it is contemplated that rollers or casters may also be conveniently used for the purpose of providing a means for sliding over the surface of the bed of the truck.

The disclosed arrangement solves a multitude of problems left unsolved by the prior art. For instance, with the disclosed invention a person who needs to take an occasional load of lawn clippings to the dump may simply place the device on the bed of the truck with the means for sliding over the bed. Then the user may load the device with the refuse to be taken to the dump. At the dump the user simply lowers the tailgate and begins to back up. When the vehicle is near the spot where the user would like to dump the refuse, the user simply activates the truck's brakes, and thus allows the momentum of the refuse and the truck unloading device to carry the refuse and the device out of the bed of the truck.

The invention disclosed herein is designed to separate itself from the refuse as the refuse and the invention leave the bed of the truck. As the refuse and the invention leave the truck the front panel of the invention is the first portion to exit the bed of the truck. As the front panel exits it will begin to swing down as permitted by the front hinge. The leading edge of the front panel eventually hits the ground at an angle that causes the front panel to continue rotating in a direction that will eventually bring the front panel under the main panel. In the meantime, the refuse continues to travel away from the bed of the truck.

Soon after the front panel swings under the main panel the front hinge will contact the ground, stopping the movement of the invention, and allowing the refuse to continue its motion. Thus, the device will stop at a distance that is very close to the bed of the truck, while the refuse will land a short distance away.

Once the truck has stopped, and the refuse been unloaded, the user may then simply pick up the invention and load it back on to the back of the truck.

A rear panel may also be attached by means of a hinge to the main panel at an edge opposite to the edge of the front hinge. The rear panel is especially advantageous for situations where the bed of the truck is long. In these applications it would not be advantageous to simply provide a version of the invention with a long main panel. This is because it has been found that when the main panel moves out, and the front panel swings under the main panel, the main panel is soon after stopped as the front hinge hits the ground. Thus, if the main panel is too long, then the panel will stop at an angle that does not allow proper separation of the refuse from the invention.

The above problem is solved by hingedly attaching the rear panel to the main panel. With this arrangement, the device can be used to unload the beds of trucks with longer beds. The problem of having the main panel stop at an angle that does not allow proper separation is obviated because the hinge between the main panel and the rear panel allows the main panel to swing away from the refuse as it leaves the bed of the truck. This allows proper separation with the refuse.

Additionally, once the main panel slides past the bed of the truck, it drops down, away from the moving refuse. As the main panel drops down, the rear panel slides over the edge of the bed of the truck. The hinged connection of the main panel to the rear panel causes the rear panel to swing up relative to the main panel, giving an additional impulse to refuse on top of the rear panel, further enhancing the separation of the refuse and the invention.

It has been found that it is advantageous to lay a tarpaulin or other strong blanketing member over the invention before loading materials on top of the device. The tarpaulin serves to enhance the separation of the device and the load being discarded from the bed of the truck. Also, the tarpaulin may be used to cover the materials to be discarded in order to prevent these materials from being blown off of the truck as one drives the loaded truck to the dump. Still further, the tarpaulin may be advantageously used to prevent some of the materials from being left inside the bed of the truck. The tarpaulin may also include a built in carrying handle, so that the tarpaulin can also be used to wrap and carry the device when not in use.

It has been found that with the disclosed invention the refuse and the invention will come to rest at two separate locations. The invention will land near the truck, while the refuse will land further away from the truck. Thus when the unloading is complete, the user simply steps out of the truck and folds the rear panel and the front panel over the main panel, and thus converts the device into a convenient package that can be easily picked up and loaded back on to the truck.

From the above discussion it can be understood that the instant invention solves the problems associated with the prior art in that an unloading device that does not require the use of rails or guides has been developed.

Moreover, the invention solves the problems associated with devices that require modifications to the vehicle. Still further, it can be appreciated that the invention solves the problems associated with devices that take up much needed space from the vehicle, or devices that cannot be easily removed from the vehicle and stored in, say, the owner's garage.

It will should also be understood that the invention provides a very simple, but effective, system for easily unloading the bed of a truck. The system saves time in unloading and serves to protect the surface of the truck's bed, much like a pickup truck bed liner.

Still further, the invention does not require that the driver pay attention to when or how to carry out the unloading operation, and thus the invention allows the reliable reproduction of effective results regardless of the skills of the user.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
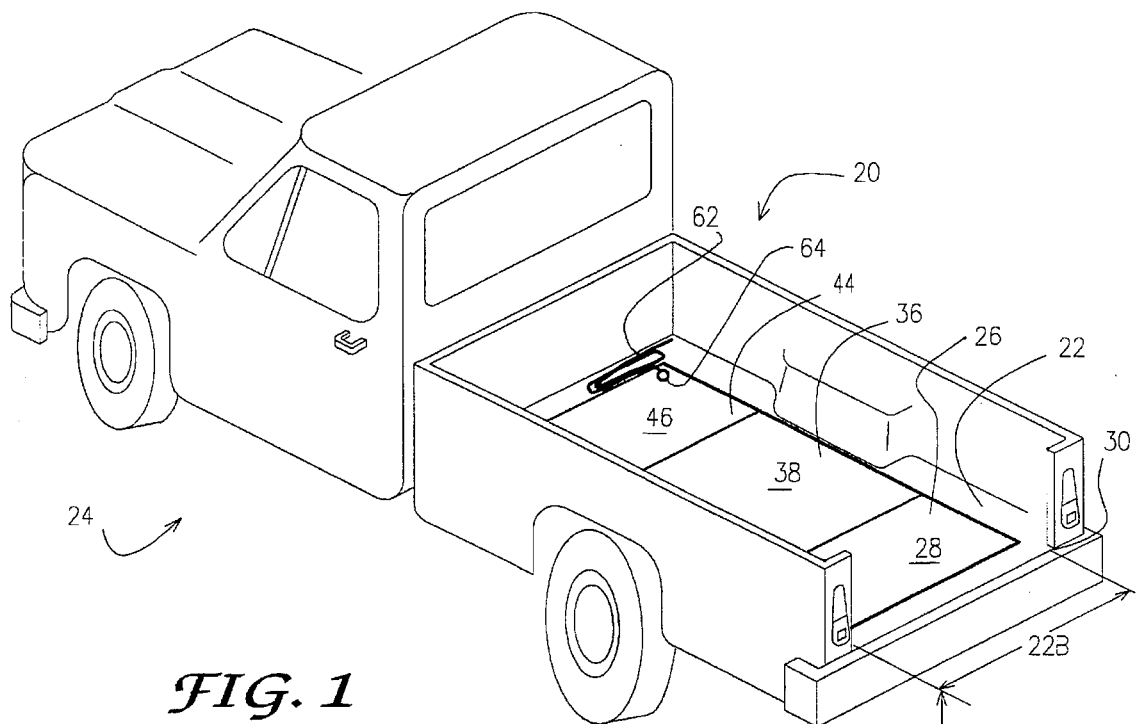
FIG. 1 shows a perspective view of the truck bed unloading apparatus mounted on the bed of a truck, ready for receiving a tarpaulin, before loading the bed of the truck.

Turning now to the drawings in which FIG. 1 illustrates a perspective view of an embodiment of the invention which comprises of a truck bed unloading device 20, which is shown mounted on the bed 22 of a truck 24, the bed having a height 22A and a width 22B, as well as a surface 23. The truck bed unloading device 20 is primarily used for carrying and unloading a load of material (not shown), such as waste material to be taken to a sanitary landfill, or fill material to a desired area to be filled, or any other materials typically carried on trucks. While performing the carrying function, the device serves much like a pickup truck bed liner, when performing the unloading function the device allows the user to unload the bed 22 of the truck 24 quickly.

Figure 2:
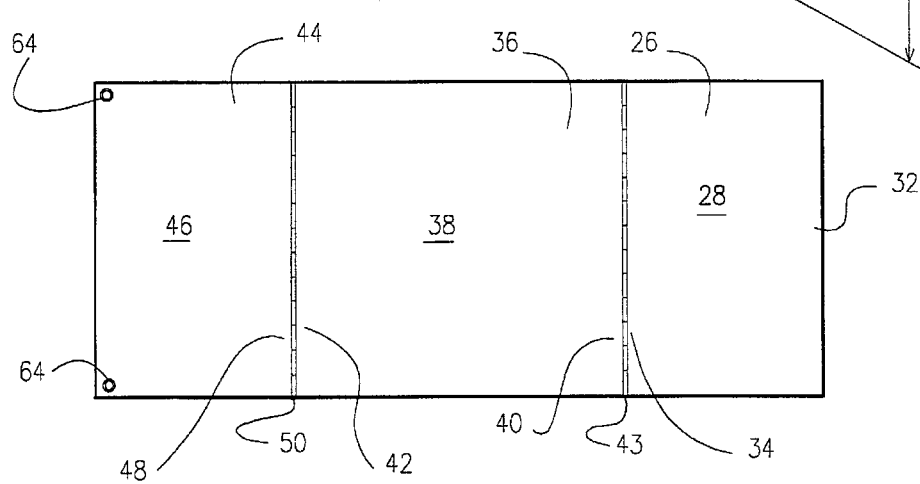
FIG. 2 shows a plan view of the truck bed unloading apparatus.

Referring to FIGS. 1 and 2, it is shown that a preferred version of the truck bed unloading device 20 generally includes a front panel 26 which includes an upper surface 28, a leading edge 32, a rearward edge 34, which is substantially parallel to the leading edge 32 of the front panel 26. The leading edge 15 is adapted to be substantially parallel to an end edge 35 of the bed 22. On trucks having beds with sides, the end edge 35 would simply be the rear edge area near the rear bumper or tailgate commonly found on a truck.

Also illustrated in FIGS. 1 and 2 is a main panel 36, which is adapted for fitting next to the front panel 26 in the bed 22 of the truck 24. The main panel 36 includes an upper surface 38, a lower surface 39, a forward edge 40, and a rearward edge 42. The forward edge 40 of the main panel 36 is attached to the rearward edge 34 of the front panel 26 by a front hinge means, which in a preferred embodiment is a two way hinge 43.

Figure 5:
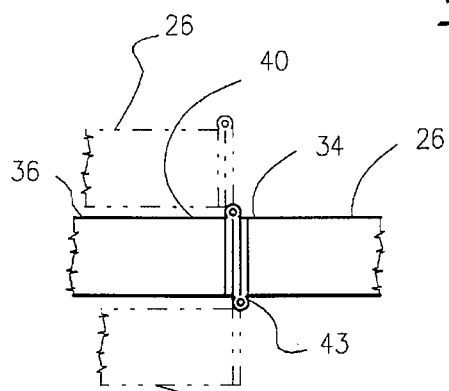
FIG. 5 shows a detail view of the range of folding of the front panel relative to the main panel with an embodiment of a two way hinge mechanism that may be used with the invention.

A preferred embodiment of the two way hinge 43 has been illustrated in FIG. 5, which shows that the two way hinge 43 will allow the front panel 26 to swing from a first position where the front panel 26 is immediately over the upper surface 38 of the main panel 36, to a second position where the front panel 26 is immediately below the lower surface 39 of the main panel 36.

The basic construction, which includes the main panel 32 and the front panel 26 joined together by the front hinge means 34, is contemplated to be particularly well suited for applications involving small pickup trucks and the like. However, as shown on FIGS. 1 through 8, a preferred embodiment of invention further includes a rear panel 44 that includes an upper surface 46 and a forward edge 48. The forward edge 48 of the rear panel 44 is connected to the rearward edge 42 of the main panel 36 by means of a rear hinge means 50. The rear hinge means 50 may be a two way hinge similar to the hinge used to join the front panel 26 to the main panel 26, but it is contemplated that a one way, single hinge (with only one axis of rotation) is preferable in order to keep costs down.

Figure 3:
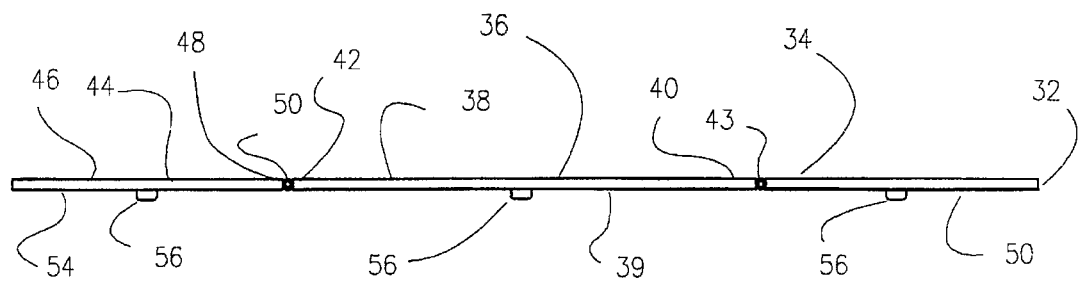
FIG. 3 shows a side view of the truck bed unloading apparatus.

Referring now to FIG. 3, where it has been shown that the front panel 26 also has a lower surface 52, and that the rear panel has a lower surface 54. Attached to the lower surface 39 of the main panel 36, as well as to the lower surface 52 of the first panel and the lower surface 54 of the rear panel, is at least one means for sliding 56 over the surface of the bed 22 of the truck 24. In a preferred embodiment the means for sliding 56 over the surface 23 of the bed 22 comprise skid pads of a polymer material, however it is contemplated that these means for sliding 56 may also comprise rollers, or casters.

Figure 6:
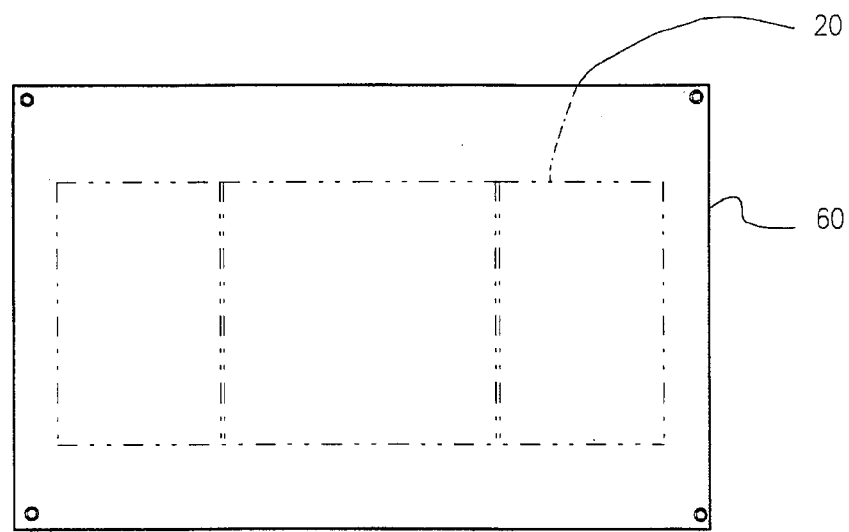
FIG. 6 shows the overlay of a tarpaulin over the device before loading the tarpaulin and the device.

As shown on FIG. 6, it is preferred that the truck bed unloading device 20 be used with a tarpaulin means 60 for wrapping the load of material carried on the unloading device 20. It is advantageous to use the tarpaulin means 60 together with the truck bed unloading device 20 in order to provide a means for wrapping and covering a load of material to be carried with the truck bed unloading device 20. By placing a tarpaulin means 60 over the upper surface 28 of the front panel 26, the upper surface 38 of the main panel 36 and over the upper surface 46 of the rear panel 44, one can wrap the load of material to be carried, and as will become clearer from the discussion below one can use the tarpaulin means 60 to enhance the performance of the invention.

Figure 4:
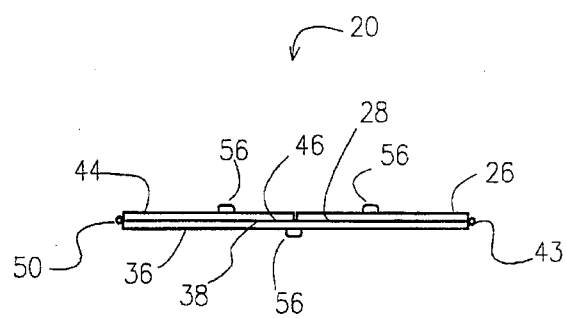
FIG. 4 shows the truck bed unloading device folded for storage.

Referring now to FIG. 4, it is shown that a preferred embodiment of the invention which includes both the front panel 26 and the rear panel 44, the front panel 26 and the rear panel 44 are adapted to fold over the main panel 36, and thus allow the device 20 to fold to a compact proportion that allows easy storage of the truck bed unloading device 20 when not in use. Also, it is contemplated that the tarpaulin means 60 may also be used to wrap up or cover the device in its folded position, and thus provide a tidy, easy to store package. Still further, it is contemplated that the tarpaulin means 60 may also include handles (not shown) that are exposed when the tarpaulin means 60 is wrapped over the folded truck bed unloading device 20, and thus provide a handle means for convenient transport of the device 20 within the tarpaulin means 60.

Figure 7:
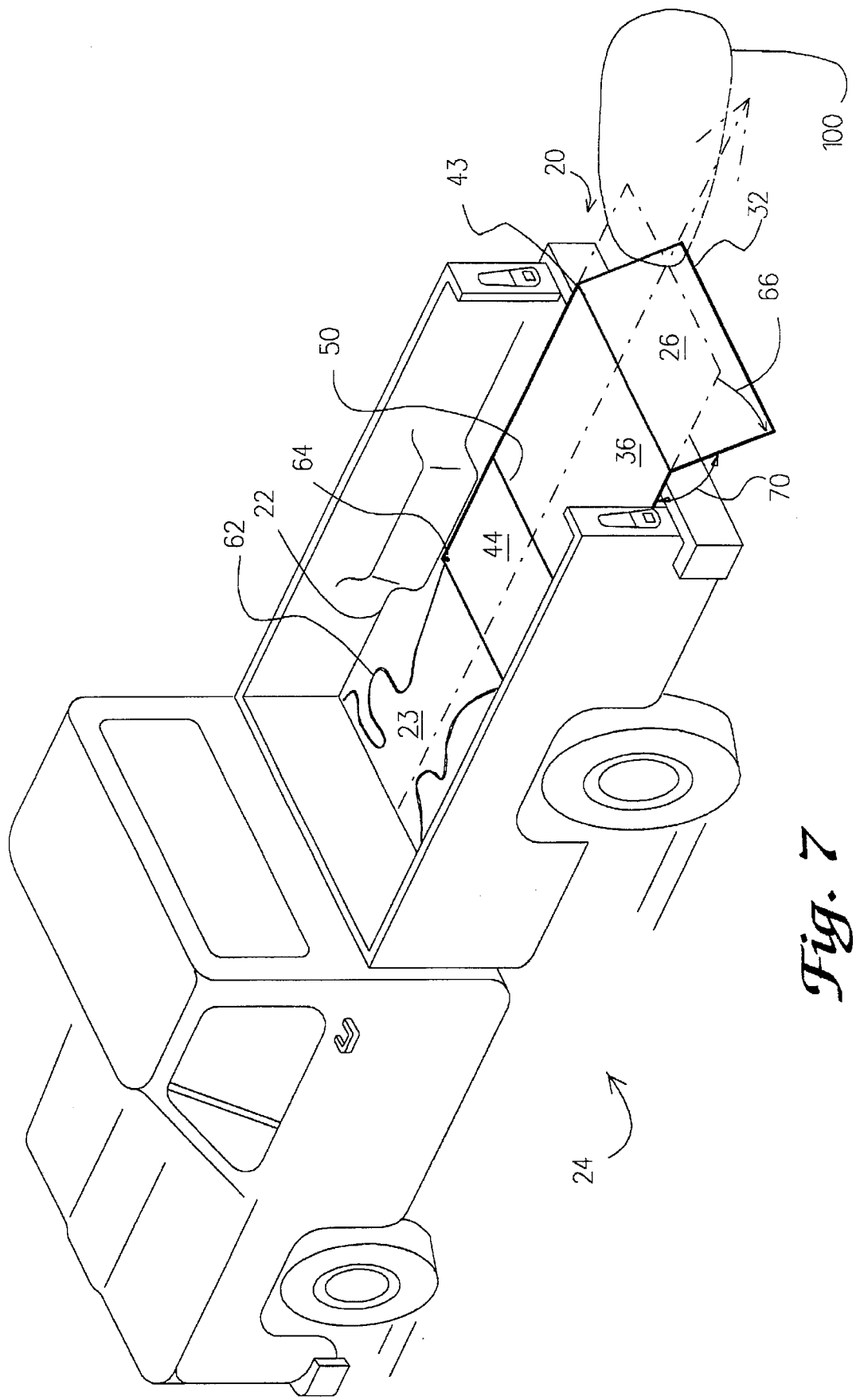
FIG. 7 shows a perspective view of the device as it begins to slide out of the bed of the truck once the truck's brakes have been applied and, the view shows the front panel as it begins to swing down.
Figure 8:
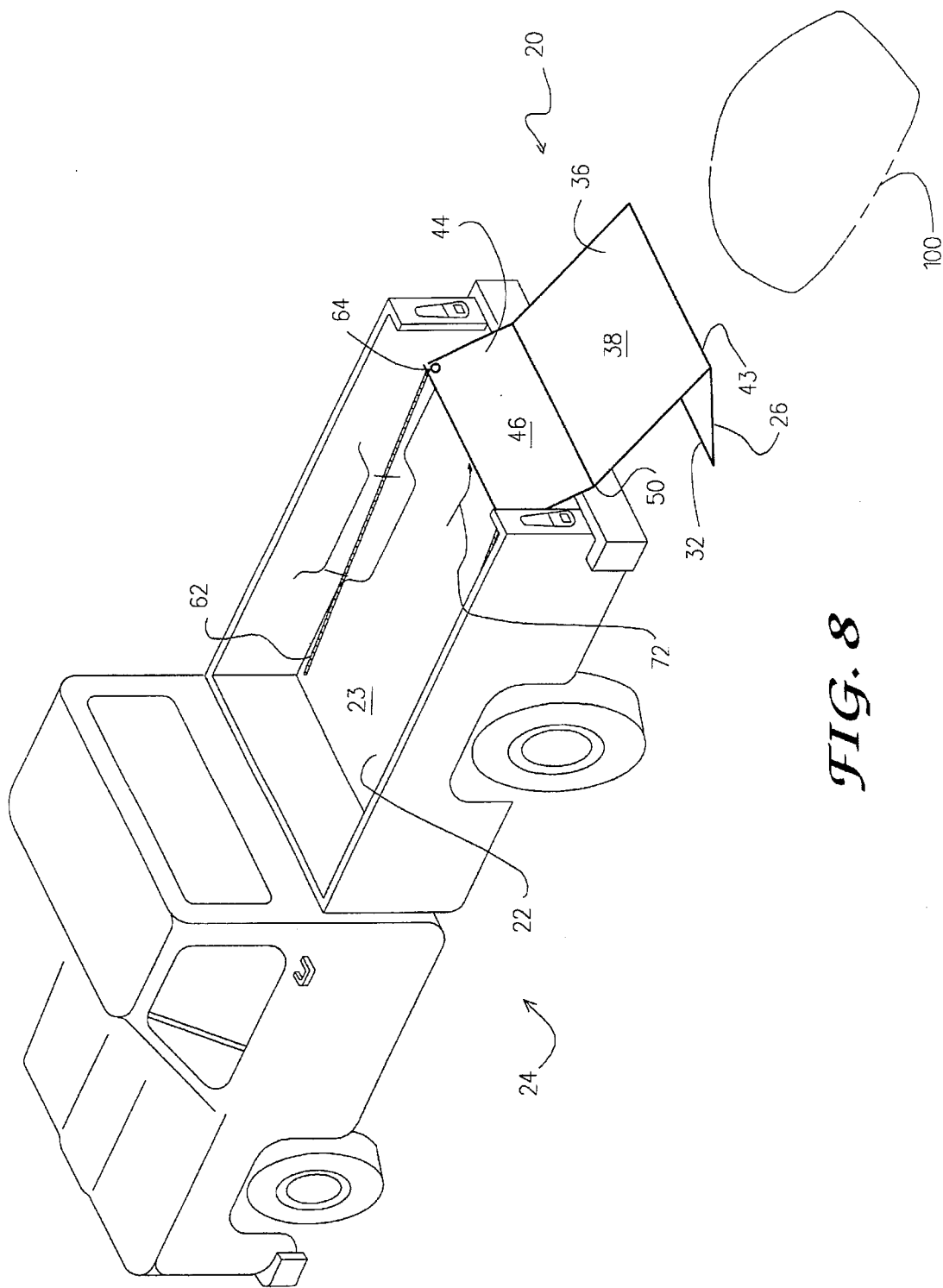
FIG. 8 is a perspective view of the truck bed unloading device as the front panel begins to curl under the main panel and the rear hinge means clears the bed of the truck as a load of material is allowed to slide out of the bed of the truck.

The unloading operation of the instant invention is illustrated in general in FIGS. 1, 7 and 8. Referring first to FIG. 1, where an embodiment of the invention is shown with tethers 62 attached to eyelets 64 which are included near a corner of the rear panel 44. The tethers 62 have ends fixed to the bed 22 of the truck 24 and to eyelets 64 incorporated in the truck bed unloading device 20.

When the invention is in the position shown on FIG. 1 it is preferred that the tarpaulin means 60 be placed over the truck bed unloading device 20, before loading material over the invention. As mentioned above, once material has been loaded over the tarpaulin means 60, the tarpaulin means may be used to cover the load of materials to be transported with the invention 20.

Referring now to FIG. 7, after arriving at the location where the materials 100 are to be unloaded from the bed 22 of the truck 24, the user simply lowers the tailgate (if the truck has one) and then begins to accelerate as the truck backs up. When the truck achieves a desired speed, the driver then activates the brakes to get the vehicle to stop quickly. Because the load of materials will have acquired a certain amount of kinetic energy (momentum) before brakes of the truck 24 were applied, the materials in the bed 22 of the truck 24 will continue to move after the truck has stopped. The means for sliding 56 on the lower surfaces of each of the panels will ensure that the load of material 100 will slide over and out of the bed 22 of the truck 24 easily.

As can be appreciated from FIG. 7, when the brakes to the truck 24 are applied, the load of material 100 will slide over and out of the bed 22 of the truck 24 together with the invention 20. As the load, together with the invention 20, slides out of the bed 22, the first portion of the invention 20 to exit the bed 22 will be the front panel 26. As the front panel 26 begins to exit the bed 22, the front panel will be urged down by the force of gravity. Later, as the two way hinge 43 leaves the bed 22, the front panel 26 will begin to swing down as indicated in general by arrow 66 in FIG. 7.

As the front panel 26 slides out and swings down, its leading edge 32 will eventually strike the ground. In a preferred embodiment the front panel has been configured to have a length 68 which allows the formation of an angle 70 of less than 135 degrees, measured between the lower surface 52 of the front panel 26 and the lower surface 39 of main panel 36, as the leading edge 32 of the front panel 26 strikes the ground. It has been discovered that with this configuration the front panel 26 will swing under the main panel 36 once the leading edge 32 of the front panel 26 has struck the ground. This allows the front panel 26 to curl under the main panel 36 as the load, together with the device 20, slides out of the bed 22 of the truck 24, thereby causing separation of the load of material 100 from the device 20 as the load exits the bed 22 of the truck 24. By using the tarpaulin means over the truck bed unloading apparatus 20, between the apparatus 20 and the load of materials, one enhances the ability to have the device 20 land away from the materials to be unloaded.

It is contemplated that if the length 68 of the front panel 26 is less than the height 22A of the bed 22 of the truck 24, then a configuration that allows the front panel 26 to swing under or "curl under" the main panel 36 as the load slides out of the bed 22 will also be achieved. If the length 68 of the front panel is too long, the front panel will not curl under the main panel as the truck is unloaded. A failure to curl under will cause some of the load to land on top of the device, pinning the device under the load or breaking the device if a two way hinge and a front panel and a main panel are not used.

It should be noted that by including the rear panel 44 one may allow the main panel 36 to slide past the edge of the bed 22 of the truck 24. Once the main panel 36 slides over the edge of the bed 22 of the truck 24, the main panel 36 will begin to fall over the end edge 35 of the bed 22, which will force the rear panel 44 to swing up in the direction indicated by arrow 72 on FIG. 8. As the rear panel 44 swings up, it will give the exiting materials a final push away from the truck 24 and further enhance the likelihood of having the load of materials 100 land completely clear of the invention 20.

Once the truck 24 has been unloaded in the manner explained above, the user may then step out of the truck 24 and retrieve the invention 20. The invention 20 may then be folded up by folding the front panel 26 over the main panel 36 and folding the rear panel 44 over the main panel 36 in the manner shown on FIG. 4. The tarpaulin means 60 may then be used to cover the folded up panels, and the device 20 stowed back into the bed 22 of the truck 24.

Thus it is contemplated that it may be desirable to store the device 20 in an area other than the bed 22 of the truck 24 when the device is not in use. Referring now to FIG. 4, it can be understood that by incorporating the two way hinge 43 between the front panel 26 and the main panel 36, one allows the device 20 to be foldable, so that the front panel 26 may be folded over the main panel 36, in a manner that allows the upper surface 28 of the front panel 26 to face the upper surface 38 of the main panel 26. Similarly, since the rear panel 44 is hingedly attached to the main panel 36, the rear panel 44 may also be folded over the main panel 36 so that the upper surface 46 of the rear panel 44 faces the upper surface 38 of the main panel 36. When folded in the manner described above, the device will take up little room and thus allow easy storage.

Figure 9:
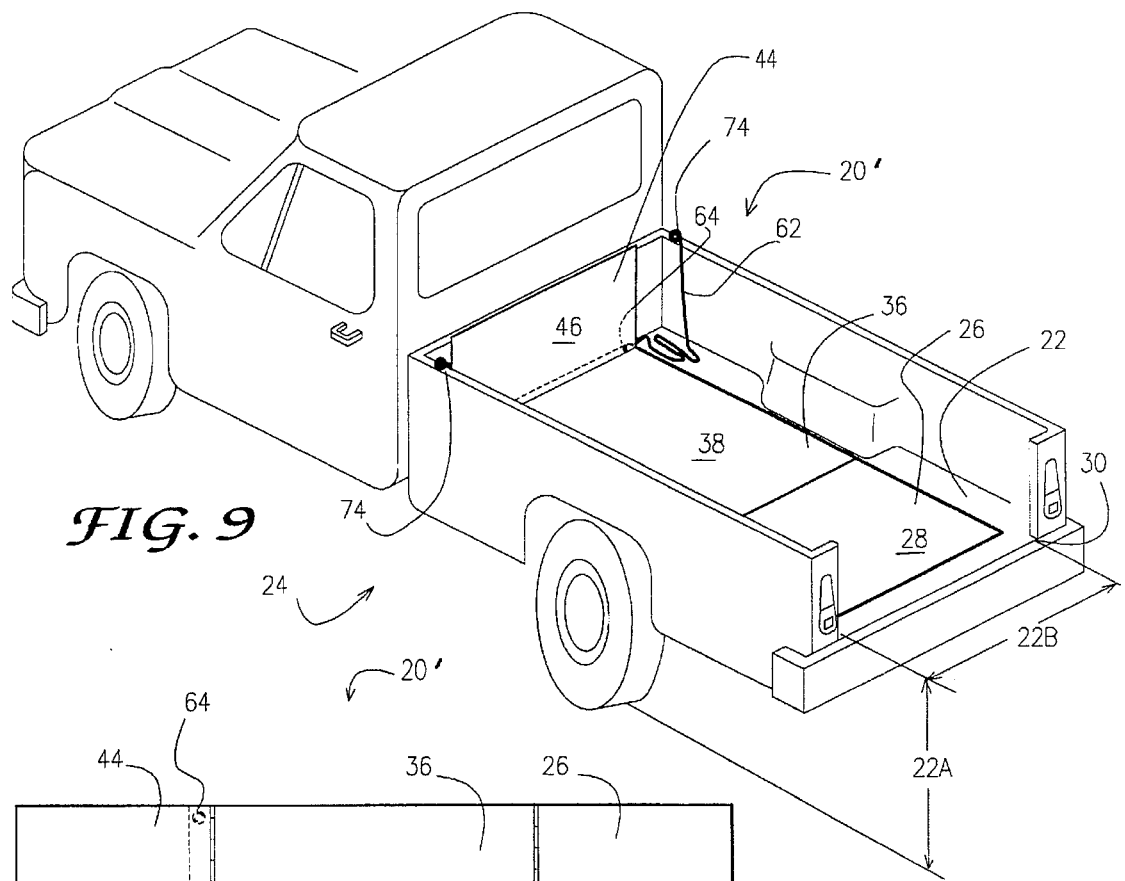
FIG. 9 shows a perspective view of another embodiment of the truck bed unloading apparatus mounted on the bed of a truck, ready for receiving a tarpaulin, before loading the bed of the truck.

An alternate preferred embodiment 20' is shown on FIG. 9, where the device 20' is shown having a main panel 36 which is hinged to the rear panel 44 along a line that is substantially parallel to the rearward edge 42 of the main panel 36, providing hinge line that is slightly offset from the rearward edge 42 of the main panel 36. This configuration allows the placement of the eyelets 64 between the rearward edge 42 of the main panel 36 and the rear hinge means 50, so that the tethers 62 may be attached to the main panel 36 instead of the rear panel 44. It has been found that with this configuration the rear panel 44 remains free to swing forward, away from the truck's bed 22, and thus provides good separation of the material to be dumped from the device 20'.

Figure 10:
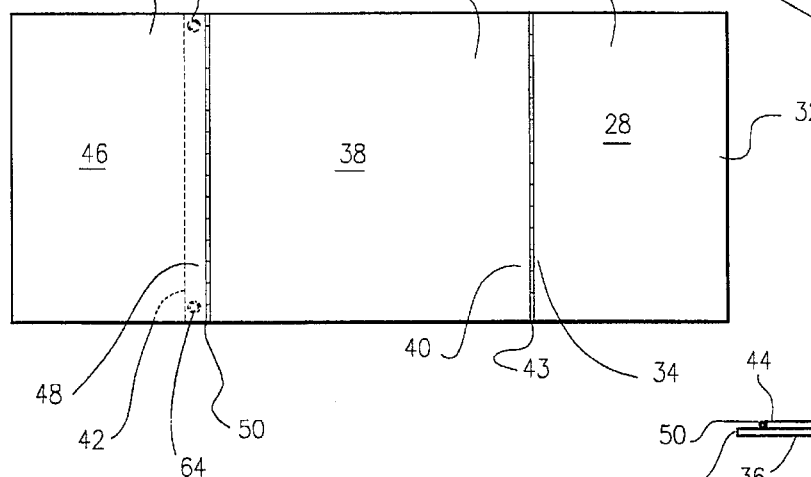
FIG. 10 shows a plan view of the embodiment of the truck bed unloading apparatus shown on FIG. 9.
Figure 11:
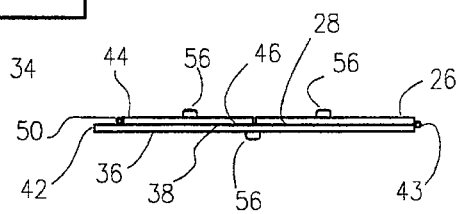
FIG. 11 shows the embodiment shown on FIG. 9 of the truck bed unloading device folded for storage.

Also, the offset attachment of the rear hinge means 50 illustrated in FIGS. 9 through 11 allows the rear panel 44 to assume a substantially normal (right angle) position relative to the main panel 36 when mounting the device in the bed 22 of the truck 24. Therefore, the offset hinge attachment will allow the rearward edge 42 of the main panel 36 to be pressed against the vertical wall of the truck's bed 22 while allowing the rear panel 44 to assume a substantially vertical position relative to the main panel 36 when the device 20' is mounted in the bed 22 of the truck 24. The offset mounting allows the rear panel 46 to rest on the overhanging lip or ridge that is typically found along the border of the vertical walls of the bed 22 of the truck 24.

By allowing the rearward edge 42 of the main panel 36 to butt up against the vertical wall of the bed 22 of the truck 24, one can minimize the distance by which the device can move towards the cab of the truck 24 when braking in traffic. The danger of having the device 20 or 20' slide out of the bed 22 or up against the tailgate of the bed 22 can be minimized by incorporating stops or brakes into the means for sliding 56.

As has been illustrated in FIG. 11, the folding of the invention including the offset hinge setup illustrated in FIGS. 9 through 11 is accomplished in much the same manner as in the embodiment shown on FIGS. 1 through 8. The embodiments shown allow the device to be folded up and wrapped up in the tarpaulin means 60 or simply folded up and stored with the tarpaulin means 60 on top of the device. It is contemplated that the tethers 62 may also be conveniently used for bundling or tieing the components together for storage.

As has been illustrated in FIG. 9, the tethers 62 may alternatively be attached to the sides of the bed 22. It is contemplated that this attachment may be accomplished by means of well known attachment means that use a rubber expansion plug that fits into an aperture found along the edge of the bed 22, and is then expanded by tightening of a bolt that fits through the rubber plug. Attached to the bolt is an eye 74, to which the tethers 62 attach.

Thus, it can be appreciated that particular embodiments of the invention disclosed herein is designed to separate itself from the a load as the load and the invention leave the bed 22 of the truck 24. Moreover, it is readily understood from the forgoing that the disclosed invention provides benefits in simplicity of manufacture, ease of use, ease of storage, as well as other benefits that will become readily apparent to those skilled in the art.

It will be appreciated by those skilled in the art that the above described embodiments are illustrative of just a few of the numerous variations of arrangements of the disclosed elements used to carry out the disclosed invention. While the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A device for carrying and unloading a load of material from a bed on a truck, the bed having a surface, the device comprising:

a main panel having an upper surface, a forward edge and a lower surface, the lower surface having means for sliding over the surface of the bed;

a front panel having an upper surface, a rearward edge, and a lower surface, the lower surface having means for sliding over the surface of the bed; and front hinge means connecting said forward edge of said main panel to the rearward edge of said front panel to allow said main panel and said front panel to lie in an initial substantially planar position and allow said front panel to swing at least ninety degrees in a direction facing the lower surface of the front panel, so that the load of material together with device can be slid over and out of the bed of a truck when unloading, and so that said front panel may flip under said main panel as the load, together with the device, slides out of the bed of the truck, thereby causing separation of the load of material from the device when the load is unloaded from the bed of the truck.

2. A device according to claim 1 and further comprising tarpaulin means for wrapping a load of material, the tarpaulin means mountable over said main panel and said front panel.

3. A device according to claim 1 wherein said front hinge means comprises a two way hinge.

4. A device according to claim 3 wherein the means for sliding over the surface of the bed on said main panel and the means for sliding over the surface of the bed on said front panel are skid pads of a polymer material.

5. A device according to claim 3 wherein the means for sliding over the surface of the bed on said main panel and the means for sliding over the surface of the bed on said front panel are rollers.

6. A device according to claim 1 and further comprising:

a rearward edge on said main panel, the rearward edge being substantially parallel to the forward edge of the main panel;

a rear panel having an upper surface, a forward edge and a lower surface having means for sliding over the surface of the bed; and rear hinge means for pivotally connecting said forward edge of said rear panel to said rearward edge of said main panel.

7. A removeable device for carrying and unloading a load of material from a bed on a truck, the bed having a surface, a width and a height, the device comprising:

a main panel having an upper surface, a forward edge and a lower surface, the lower surface having means for sliding over the surface of the bed;

a front panel having an upper surface, a rearward edge adapted to be substantially perpendicular to the width of the bed, a length adapted to be shorter than the height of the truck's bed, and further having an upper surface, a lower surface, the lower surface having means for sliding over the surface of the bed; and front hinge means for pivotally connecting said forward edge of said main panel to the rearward edge of said front panel to allow said main panel and said front panel to lie in an initial substantially planar position and allow said front panel to swing at least ninety degrees in a direction facing the lower surface of the front panel, so that the load of material together with device can be slid over and out of the bed of a truck when unloading, and so that said front panel flips under said main panel as the load, together with the device, slides out of the bed of the truck, thereby causing separation of the load of material from the device when the load is unloaded from the bed of the truck.

8. A device according to claim 7 and further comprising tarpaulin means for wrapping a load of material, the tarpaulin means mountable over said main panel and said front panel.

9. A device according to claim 7 wherein said front hinge means comprises a two way hinge.

10. A device according to claim 9 wherein said main panel has a length and said front panel has a length that is shorter than the length of said main panel.

11. A device according to claim 9 wherein the means for sliding over the surface of the bed on said main panel and the means for sliding over the surface of the bed on said front panel are skid pads of a polymer material.

12. A device according to claim 9 wherein the means for sliding over the surface of the bed on said main panel and the means for sliding over the surface of the bed on said front panel are rollers.

13. A portable device for unloading a load of material from a bed on a truck, the bed having a surface, a width and a height, the device comprising:

a rear panel having an upper surface, a forward edge and a lower surface having means for sliding over the surface of the bed;

a main panel having an upper surface, a forward edge, a rearward edge, and a lower surface, the lower surface having means for sliding over the surface of the bed;

a front panel having an upper surface, a rearward edge adapted to be substantially perpendicular to the width of the bed, a length adapted to be shorter than the height of the truck's bed, and further having an upper surface, a lower surface, the lower surface having means for sliding over the surface of the bed;

rear hinge means for pivotally connecting said forward edge of said rear panel to said rearward edge of said main panel; and front hinge means for pivotally connecting said forward edge of said main panel to the rearward edge of said front panel and allowing said front panel to swing in a direction facing the lower surface of the front panel, so that the load of material together with device can be slid over and out of the bed of a truck when unloading, and so that said front panel swings under said main panel and said rear panel swings towards said main panel as the load, together with the device, slides out of the bed of the truck, thereby causing separation of the load of material from the device when the load is unloaded from the bed of the truck.

14. A device according to claim 13 and further comprising tarpaulin means for wrapping a load of material, the tarpaulin means mountable over said main panel and said front panel.

15. A device according to claim 13 wherein said front hinge means comprises a two way hinge.

16. A device according to claim 15 wherein said rear hinge means comprises a one way hinge.

17. A device according to claim 15 wherein said rear hinge means comprises a two way hinge.

18. A device according to claim 15 wherein said main panel has a length and said front panel has a length that is shorter than the length of said main panel.

19. A device according to claim 15 wherein the means for sliding over the surface of the bed on said main panel and the means for sliding over the surface of the bed on said front panel are skid pads of a polymer material.

20. A device according to claim 15 wherein the means for sliding over the surface of the bed on said main panel and the means for sliding over the surface of the bed on said front panel are rollers.

* * * * *